United States Patent
Shimada et al.

(10) Patent No.: US 7,337,082 B2
(45) Date of Patent: Feb. 26, 2008

(54) DIGITAL MEASUREMENT INSTRUMENT FOR ACQUIRING MEASUREMENT AND TIME VALUES

(75) Inventors: Koji Shimada, Fukuchiyama (JP); Masahiro Kawachi, Kyotanabe (JP)

(73) Assignee: Omron Corporation, Kyoto-Shi (JP)

( * ) Notice: Subject to any disclaimer, the term of this patent is extended or adjusted under 35 U.S.C. 154(b) by 358 days.

(21) Appl. No.: 11/076,040

(22) Filed: Mar. 10, 2005

(65) Prior Publication Data
US 2005/0216216 A1    Sep. 29, 2005

(30) Foreign Application Priority Data
Mar. 12, 2004 (JP) .............................. 2004-070769

(51) Int. Cl.
*G01R 13/00* (2006.01)
(52) U.S. Cl. ..................... 702/66; 702/176; 702/189
(58) Field of Classification Search ................. 702/66, 702/176, 177; 710/25; 700/23, 73
See application file for complete search history.

(56) References Cited

U.S. PATENT DOCUMENTS 6,740,860 B2 * 5/2004 Kobayashi ............... 250/214.1
6,798,928 B2 * 9/2004 Iida et al. .................... 382/305
6,909,979 B2 * 6/2005 Saitou et al. ................. 702/66
7,071,452 B2 * 7/2006 Warner et al. ............... 250/205
7,191,079 B2 * 3/2007 Smith et al. .................. 702/67

* cited by examiner

*Primary Examiner*—Hal Wachsman
*Assistant Examiner*—Anthony Gutierrez
(74) *Attorney, Agent, or Firm*—Foley and Lardner LLP (57) ABSTRACT

A measurement instrument includes a measurement value acquiring portion for acquiring a measurement value in a predetermined period, and a measurement timing acquiring portion for acquiring measurement timing information. The measurement timing information is a measurement start timing, and the measurement timing information is added to the measurement value acquired in a predetermined period, corresponding to elapsed timing information which is calculated from the measurement period, based on the measurement start timing. In addition, a plurality of the measurement values added by the measurement timing information are digitally outputted collectively. In addition, an identification number of an applicable measurement instrument which number is owned by the measurement instrument is further added to the measurement value.

16 Claims, 8 Drawing Sheets

| Sensor head portion's ID number | Timing information | Measurement value (distance value) |
|---|---|---|

Fig. 6

| Sensor head portion's ID number | Real measurement time per period |
|---|---|

DIGITAL MEASUREMENT INSTRUMENT FOR ACQUIRING MEASUREMENT AND TIME VALUES

BACKGROUND OF THE INVENTION

1. Field of the Invention

The present invention relates to a measurement instrument connected to an external controlling apparatus such as a personal computer (hereinafter referred to as "PC").

2. Description of the Related Art

For example, there is a known measurement system which is a connection of a measurement instrument such as a displacement sensor, a temperature sensor and a visible sensor with an external controlling apparatus controlling the measurement instrument, herein, the external controlling apparatus implementing determination based on a measurement result by the measurement instrument (for example, refer to JP2001-141524).

The above type of measurement instrument continuously outputs a measurement value in real time to the controlling apparatus. The controlling apparatus is responsible for receiving the measurement value. In the case that a measurement object moves, timing information about when the measurement instrument acquires the measurement value is important. The controlling apparatus determines this timing information, by using an external synchronizing signal and the like. For example, when a work moving on a line flows to a predetermine position, a synchronizing sensor for sensing the work is turned ON, and synchronously with this ON input, the controlling apparatus acquires the measurement value from the measurement instrument.

In the case that the controlling apparatus is a general-purpose machine such as a PC (Personal Computer) and a PLC (Programmable Logic Controller), however, a connector terminal of the synchronizing sensor is, as the case may be, not provided. In this case, using a serial output of a digital signal such as USB for output of the measurement instrument does not continuously output the measurement value in real time. Therefore, it was difficult for the PC to acquire, in real time and per constant period, the measurement value in combination with the timing information. Thereby, the measurement value and the synchronizing timing were not capable of taking such an action that the synchronizing sensor's output is acquired on the PC side.

With the above conventional problems taken note of, it is therefore an object of the present invention to provide a measurement instrument which is capable of outputting to an external controlling apparatus a measurement value of a measurement object in combination with timing information about when the measurement value is acquired.

SUMMARY OF THE INVENTION

The other object(s) and operational advantage(s) of the present invention will become understood easily from the following description by a person skilled in the art with reference to the accompanying drawings.

According to a first aspect of the present invention, there is provided a measurement instrument which comprises:

i) a measurement value acquiring portion for acquiring a measurement value, ii) a trigger signal inputting portion into which an external trigger signal is inputted, iii) a processor for processing the thus acquired measurement value, iv) a data memorizing portion for memorizing data on a processing condition, and v) an interface portion for outputting the thus processed measurement value, wherein, the measurement value acquiring portion periodically acquires the measurement value, the data memorizing portion memorizes information specifying a maximum data number in outputting collectively a plurality of the measurement values processed as the data on the processing condition, the processor adds to the periodically-acquired measurement value measurement timing information which is based on a timing when a trigger signal is inputted, wherein, I) a first digital outputting is implemented in which, the plurality of the measurement values added by the measurement timing information are, with an acquisition order kept, sectioned into a plurality of measurement values less than or equal to the maximum data number, and the sectioned plurality of the measurement values are digitally outputted collectively from the interface portion in a time shorter than a time determined by a product of the data number and the period, II) after the first digital outputting, a second digital outputting is implemented in which, within a time determined by a product of the maximum data number and the period, a plurality of measurement values added by next measurement timing information and following the outputted measurement values are, with an acquisition order kept, sectioned into a plurality of measurement values less than or equal to the maximum data number, and the sectioned plurality of the measurement values are digitally outputted collectively from the interface portion in a time shorter than a time determined by a product of the sectioned data number and the period, and III) then, the second digital outputting is repeated.

The maximum data number in outputting collectively the plurality of the processed measurement values may be preset or inputted via the interface portion.

The adding of the measurement timing information which is based on timing when the trigger signal is inputted includes: i) only when the trigger signal is inputted, adding an identification marker which is distinguishable from other, ii) from the time the trigger signal is inputted, continuously adding the identification marker which is distinguishable from other, and iii) based on the time the trigger signal is inputted, serially adding characters (for example, alphabet and the like), numbers, symbols and the like which are so arranged to have a distinguishable order. The adding of the measurement timing information which is based on timing when the trigger signal is inputted further includes: vi) adding constantly the measurement timing information to the measurement value, v) starting with the trigger signal input, and iv) stopping with a repeated trigger signal input after the starting with the trigger signal input.

With the above structure, the measurement value acquired by the predetermined period, although being outputted collectively per sectioned unit, is added corresponding to the time when the measurement timing information which is based on the timing when the trigger signal is inputted, keeping the order in which the measurement value was acquired. Therefore, the controlling apparatus such as PC can acquire, without omission, the continuous measurement values associated with the timing when the trigger signal is inputted, by means of an output signal mode for implementing a digital outputting collectively such as USB communication. Moreover, with this measurement value, the measurement value in a predetermined period can be outputted collectively. Therefore, even a great internal between the measurement speed of the measurement instrument and the processing speed of the controlling apparatus such as PC on the output side may cause no problems, decreasing the processing load of the controlling apparatus.

Digitally outputting collectively from the interface portion for each of the sectioned plurality of measurement values in a time shorter than a time determined by the product of the data number and the measurement value acquiring period is a communication method generally used in serial transmitting method of the digital signal such as USB, denoting a method of transmitting collectively the plurality of data at a high speed, instead of discharging the data. Transmitting per period not exceeding the time determined by the above product can output all the measurement values within a certain period, without accumulating un-outputted measurement values to the measurement values which are continuously acquired.

Moreover, after the former digital outputting, the second digital outputting is implemented in which, within the time determined by the product of the maximum data number and the period, a plurality of next measurement values following the outputted measurement values are digitally outputted collectively from the interface portion. Therefore, continuous measurement values can be acquired on the controlling apparatus side such as PC, without causing a time lag (which may be observed between the timing when the measurement value is actually acquired and the data thereof are received) becoming beyond a certain value.

According to a second aspect of the present invention, there is provided a measurement instrument which comprises:

i) a measurement value acquiring portion for acquiring a measurement value, ii) a processor for processing the thus acquired measurement value, iii) a data memorizing portion for memorizing data on a processing condition, and iv) an interface portion for outputting the thus processed measurement value, wherein, the measurement value acquiring portion periodically acquires the measurement value, the data memorizing portion memorizes:

information specifying a maximum data number in outputting collectively a plurality of the measurement values processed as the data on the processing condition, and a timing determinant threshold which is compared with the measurement value, the processor adds to the periodically-acquired measurement value measurement timing information which is based on a timing when the measurement value is so varied as to stride over the timing determinant threshold, wherein, I) a first digital outputting is implemented in which the plurality of the measurement values added by the measurement timing information are, with an acquisition order kept, sectioned into a plurality of measurement values less than or equal to the maximum data number, and the sectioned plurality of the measurement values are digitally outputted collectively from the interface portion in a time shorter than a time determined by a product of the data number and the period, II) after the first digital outputting, a second digital outputting is implemented in which, within a time determined by a product of the maximum data number and the period, a plurality of measurement values added by next measurement timing information and following the outputted measurement values are, with an acquisition order kept, sectioned into a plurality of measurement values less than or equal to the maximum data number, and the sectioned plurality of the measurement values are digitally outputted collectively from the interface portion in a time shorter than a time determined by a product of the sectioned data number and the period, and III) then, the second digital outputting is repeated.

The timing determinant threshold may be preset or set externally.

With the above structure, the operation that the measurement value is so varied as to stride over the measurement timing determinant threshold is caused by, for example, a self trigger, thereby controlling presence or absence of operation of adding the measurement timing information to the measurement value.

According to the embodiment of the present invention, one of a maximum data quantity and a maximum output period may be memorized as the information specifying the maximum data number in outputting collectively the plurality of the processed measurement values. Memorizing the maximum data quantity can specify an allowable maximum data number from a scale of each data in the outputting, while memorizing the maximum output period can specify a maximum data number from the number of measurement periods which can be contained therein.

According to the embodiment of the present invention, the measurement timing information may be a measurement start timing. With the above structure, a plurality of measurement values can be outputted corresponding to the measurement start timing, with an order kept.

According to the embodiment of the present invention, the measurement timing information may be the measurement start timing and the measurement end timing. With the above structure, a plurality of measurement values can be outputted corresponding to a period between the measurement start timing and the measurement end timing, with an order kept.

According to the embodiment of the present invention, there are provided the measurement value acquiring portion for acquiring the measurement value in a predetermined period, and the measurement timing acquiring portion for acquiring the measurement timing information.

The measurement timing information is a measurement start timing, and may be added to the measurement value acquired in the predetermined period, corresponding to the time series information based on the measurement start timing, to thereby collectively digitally output a plurality of measurement values added by the measurement timing information. In this case, the time series information is, for example, a sequential serial number, and a plurality of measurement values are outputted by the sequential serial number corresponding to the measurement start timing. Therefore, the controlling apparatus and the like connected outside the measurement instrument can easily know the measurement value in combination with the timing information acquiring the measurement value.

According to the embodiment of the present invention, there are provided the measurement value acquiring portion for acquiring the measurement value in a predetermined period, and the measurement timing acquiring portion for acquiring the measurement timing information.

The measurement timing information may be a measurement start timing, and the measurement timing information may be added to the measurement value acquired in the predetermined period, corresponding to elapsed timing information which is calculated from the measurement period, based on the measurement start timing. In addition, the plurality of the measurement values added by the measurement timing information may be digitally outputted collectively. With the above structure, a plurality of measurement values can be outputted in combination with the elapsed timing information, corresponding to the measurement start timing. The elapsed timing information can be obtained easily, depending on how many periods the measurement period covers. In addition, in the external controlling apparatus, the elapsed timing information acquiring the measurement value can be used intact as real timing information.

According to the embodiment of the present invention, with the trigger signal inputted, the processor may start implementing the collective first digital outputting, and in a period when the inputting of the trigger is continued, the processor may repeat the collective second digital outputting.

According to the embodiment of the present invention, with the measurement value so varied as to stride over the timing determinant threshold, the processor may start implementing the collective first digital outputting, and until the measurement value is so varied again as to stride over the timing determinant threshold, the processor may repeat the collective second digital outputting.

According to the embodiment of the present invention, an identification number of an applicable measurement instrument which number is owned by the measurement instrument may be further added to the measurement value.

With this, in the case that a plurality of measurement instruments make inputs to the controlling apparatus connected to an external portion of the measurement instrument, the controlling apparatus can easily distinguish from which measurement instrument the thus received measurement value comes, thereby improving convenience.

As obvious from the above explanation, under the present invention, the measurement value of the measurement object can be outputted collectively to the external controlling apparatus in combination with the timing information about when the measurement value is acquired. Therefore, the external controlling apparatus can easily implement high-precision determining process and controlling process on the measurement value, moreover, bringing about an advantage of decreasing processing load of the controlling apparatus.

DESCRIPTION OF THE PREFERRED EMBODIMENTS

Hereinafter described in detail referring to drawings is one preferred embodiment of the present invention.

Figure 1:
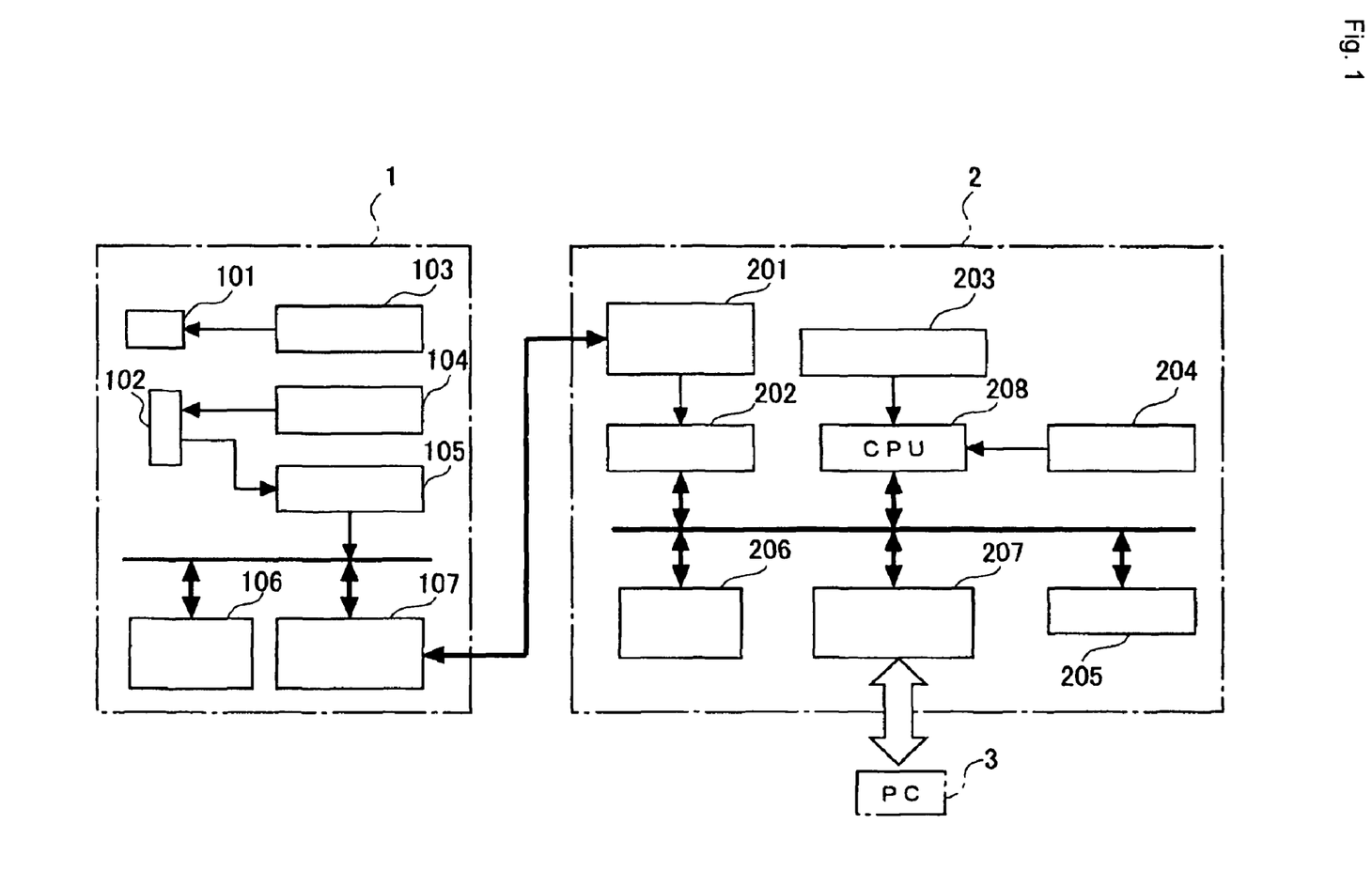
FIG. 1 shows a block diagram showing a structure of an electrical hardware of a measurement instrument.

FIG. 1 shows a block diagram showing an electrical hardware structure of a measurement instrument according to the embodiment. The measurement instrument is constructed as a displacement sensor. So as to be received compactly in a control disk and the like and to be easily installed in a narrow-and-small measurement environment, the measurement instrument has a sensor head portion 1 separated from a signal processor 2, and is connected for usage to a PC 3 which is an external controlling apparatus.

A sensor head portion 1 is provided with a light-projecting element 101, a light-receiving element 102, a light-projecting controller 103, a light-receiving controller 104, an operation processor 105, a internal memory 106, and a communication controller 107.

The light-projecting element 101 is, for example, made of an LD (laser diode), the light-receiving element 102 is, for example, made of a PD (photo diode). The light-projecting controller 103 generates a drive pulse of the light-projecting element 101, and irradiates a pulsed light toward a measurement object by means of the light-projecting element 101. The light-receiving controller 104 controls the light-receiving element 102.

The operation processor 105 acquires a light-receiving quantity which is acquired from the light-receiving element 102, to thereby calculate a characteristic quantity.

The internal memory 106 stores pieces of information such as i) a measurement period of the measurement object, ii) a maximum data number, a maximum data quantity and a maximum output period as information specifying a maximum data number in outputting collectively a plurality of processed measurement values, and iii) an ID number (identification number) of the sensor head portion 1. The communication controller 107 controls communication of the sensor head portion 1 with the signal processor 2.

The sensor head portion 1 according to the embodiment has a circuit structure as described above. According to this example, the sensor head portion 1 implements a light-projecting processing according to an instruction of the signal processor 2, and is used so as to send a light-receiving signal by a light-receiving processing in a proper timing to the signal processor 2.

The signal processor 2 is provided with a communication controller 201, a measurement controller 202, an external signal sensor 203, an SW sensor 204, a display portion 205, an internal memory 206, a USB controller 207, and a CPU 208.

The communication controller 201 implements a communication control with the sensor head portion 1, and acquires light-receiving data and the like from the sensor head portion 1. Based on the thus acquired data from the sensor head portion 1, the measurement controller 202 implements a processing for measuring a distance to the measurement object. The external signal sensor 203 senses an external signal such as an external trigger, and inputs to the CPU 208 a timing for acquiring a measurement result by the measurement controller 202.

The SW sensor 204 senses an input from a switch (not shown) or a button (not shown) disposed at the signal processor 2. The display portion 205 is provided with a liquid crystal display portion for displaying a measurement value or a measurement setting condition, a display light LED for displaying an operation state and the like, and the like. The internal memory 206 stores a calculation result of the measurement value and the like. The USB controller 207 controls a USB communication for connecting the signal processor 2 to an external PC and the like.

The CPU 208 controls an entirety of the signal processor 2. With a switch state acquired from the SW sensor 204, the CPU 208 reflects the measurement setting condition. Moreover, the CPU 208 has a function of a measurement value acquiring portion, displaying on the display portion 205 the measurement value, the measurement setting condition and the like which are acquired from the measurement controller 202. Having a function as a measurement timing acquiring portion, the CPU 208 senses a timing for generating timing information, calculates the timing information, and adds the thus calculated timing information to the measurement value.

Figure 2:
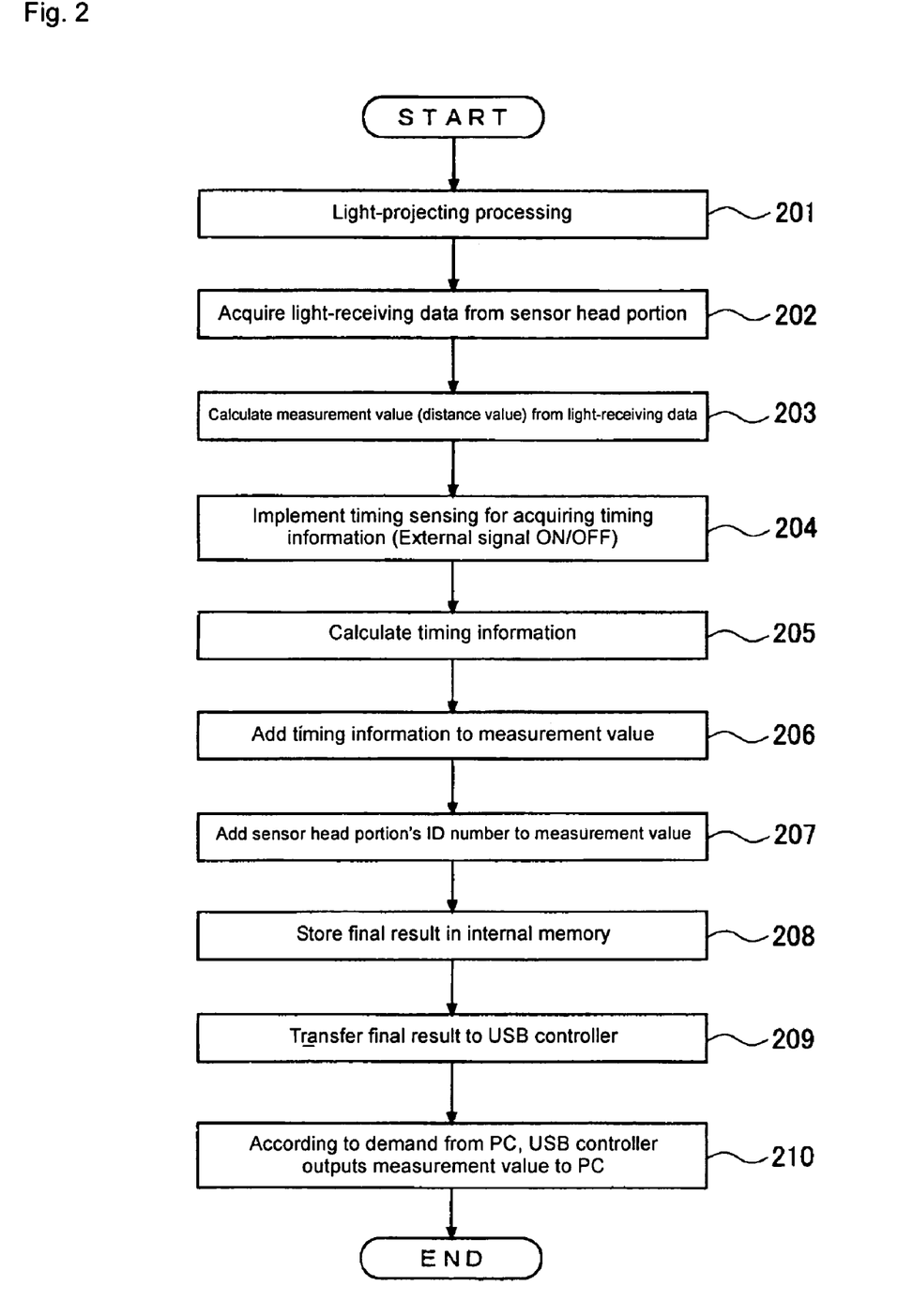
FIG. 2 shows a flowchart showing an operation of a signal processor.

FIG. 2 shows a flowchart showing an operation of the signal processor 2. With the processing started by a power source inputting, the signal processor 2 instructs the sensor head portion 1 to implement the light-projecting processing (step 201) With this, the sensor head portion 1 irradiates the pulsed light to the measurement object. The signal processor 2 acquires the light-receiving data from the sensor head portion 1 (step 202), calculating the measurement value (distance value) from the light-receiving data (step 203).

Thereafter, the signal processor 2 implements a timing sensing for acquiring the timing information (step 204). Herein, the timing sensing is implemented by the external signal sensor 203 which distinguishes whether the external signal (measurement signal) is ON or OFF. The ON external signal determines a measurement start timing, while the OFF external signal determines a measurement end timing.

After the step 204, the signal processor 2 calculates the timing information which is obtained when the measurement value is measured (step 205). The CPU 208 counts the number of measurements (count number) after the external signal is ON, and clears the number of measurements in a period when the external signal is OFF. The thus calculated timing information is expressed as a product of the count number and a measurement period which was acquired in advance from the sensor head portion 1.

After the step 205, the signal processor 2 adds the timing information to the measurement value (step 206). Moreover, to the measurement value added by the timing information, the signal processor 2 adds the sensor head portion 1's ID number which was acquired in advance (step 207). Then, the final result of the measurement value (measurement value added by the timing information and the ID number) is stored in the internal memory 206 (step 208). Moreover, the final result of the measurement value acquired in a predetermined period is to be transferred to the USB controller 207 (step 209). With a demand from the PC 3 as a trigger, the USB controller 207 collectively digitally output to the PC 3 the final result of a plurality of predetermined acquired measurement values in a maximum data number which was preset or set by the PC 3. This collective digital output, with a subsequent measurement value thereof sectioned into a predetermined plural number, and after the above-implemented collective digital output, may be implemented within a time which is determined by a product of the maximum data number and a measurement value acquiring period (step 210). Moreover, instead of being discharged in every period when a plurality of measurement values are acquired, this collective digital output is implemented by outputting at one time collectively at a high speed the predetermined plural data number in the maximum data number. With this, the PC 3 can acquire the measurement value and the timing information without causing a constant time lag, thereby smoothly implementing various determinations and controlling processes. In addition, the received data can be used by being sorted per the sensor head portion 1.

In addition, the timing sensing in the step 204 determines the measurement start timing when the external signal is ON, and the measurement end timing when the external signal is OFF. Instead, the timing sensing can be so constructed that the measurement value becoming a predetermined value or more or a predetermined value or less determines the measurement start timing or the measurement end timing. In addition, the timing information calculated at the step 205 may be the count number itself. In this case, the PC 3 has such a function as to rearrange along the measurement time the data received from the signal processor 2. Alternatively, as timing information, making such a structure as to add an identification marker only to a measurement value which corresponds to the measurement timing is allowed.

Figure 3:
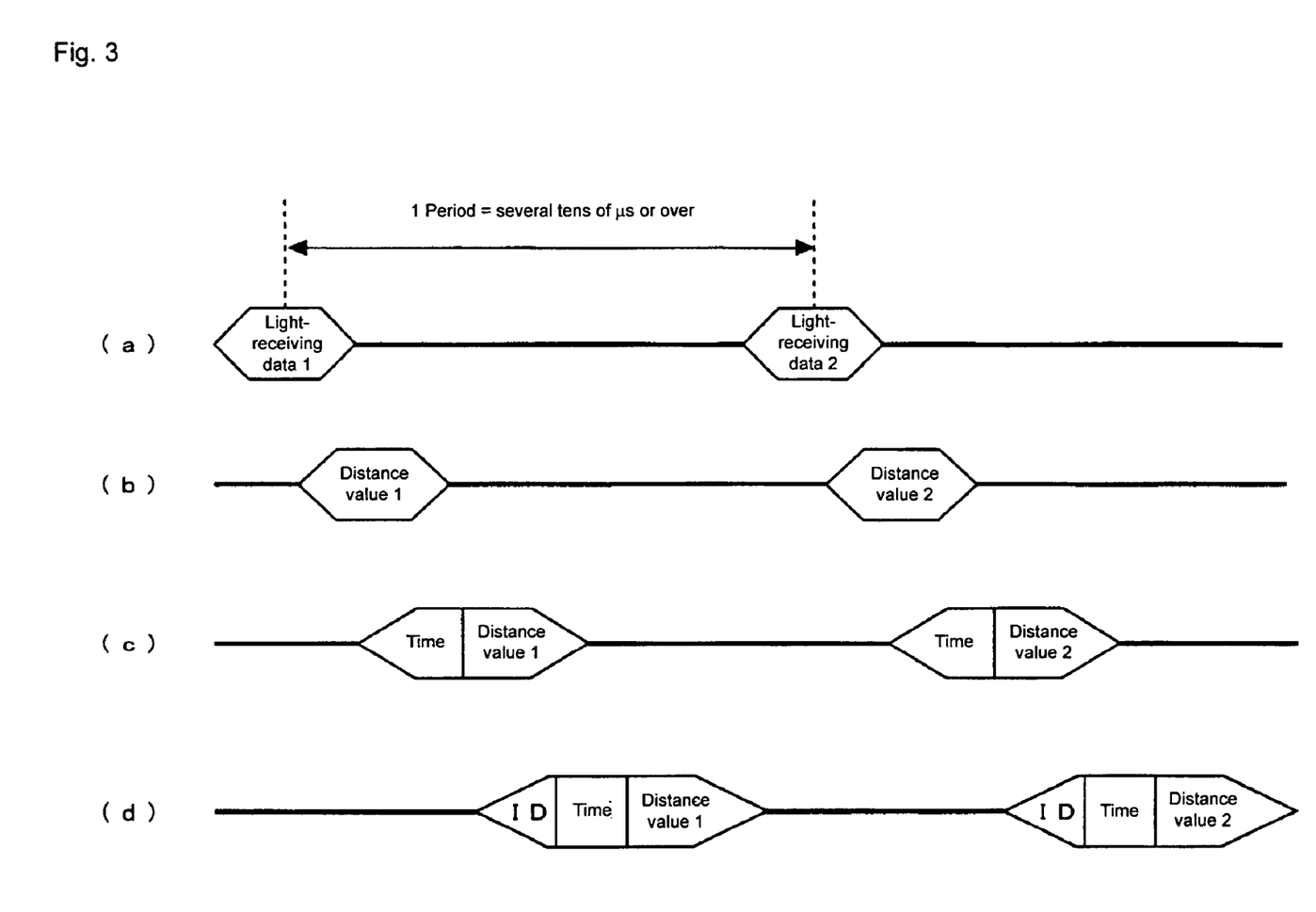
FIG. 3 shows a time chart showing a process flow in the signal processor.

FIG. 3 shows a time chart showing a flow of the process of adding timing information to the measurement value in the signal processor 2. In this example, the measurement controller 202 of the signal processor 2 acquires in a timing shown in FIG. 3A light-receiving data 1 and light-receiving data 2 (step 202) and calculates in a timing shown in FIG. 3B a distance value 1 and a distance value 2 as measurement value (step 203).

The CPU 208 calculates timing information of the distance value 1 and timing information of the distance value 2 (step 205), adds timing information to the distance value 1 in a timing shown in FIG. 3C, and likewise adds timing information to the distance value 2 (step 206). Moreover, to the distance value 1 and the distance value 2 which are added by the timing information, the CPU 208 adds ID numbers of the sensor head portion 1 in timings shown respectively in FIG. 3D (step 207). Herein, an interval (1 period) between the light-receiving data 1 and the light-receiving data 2 is several tens of μs or over.

Figure 4:
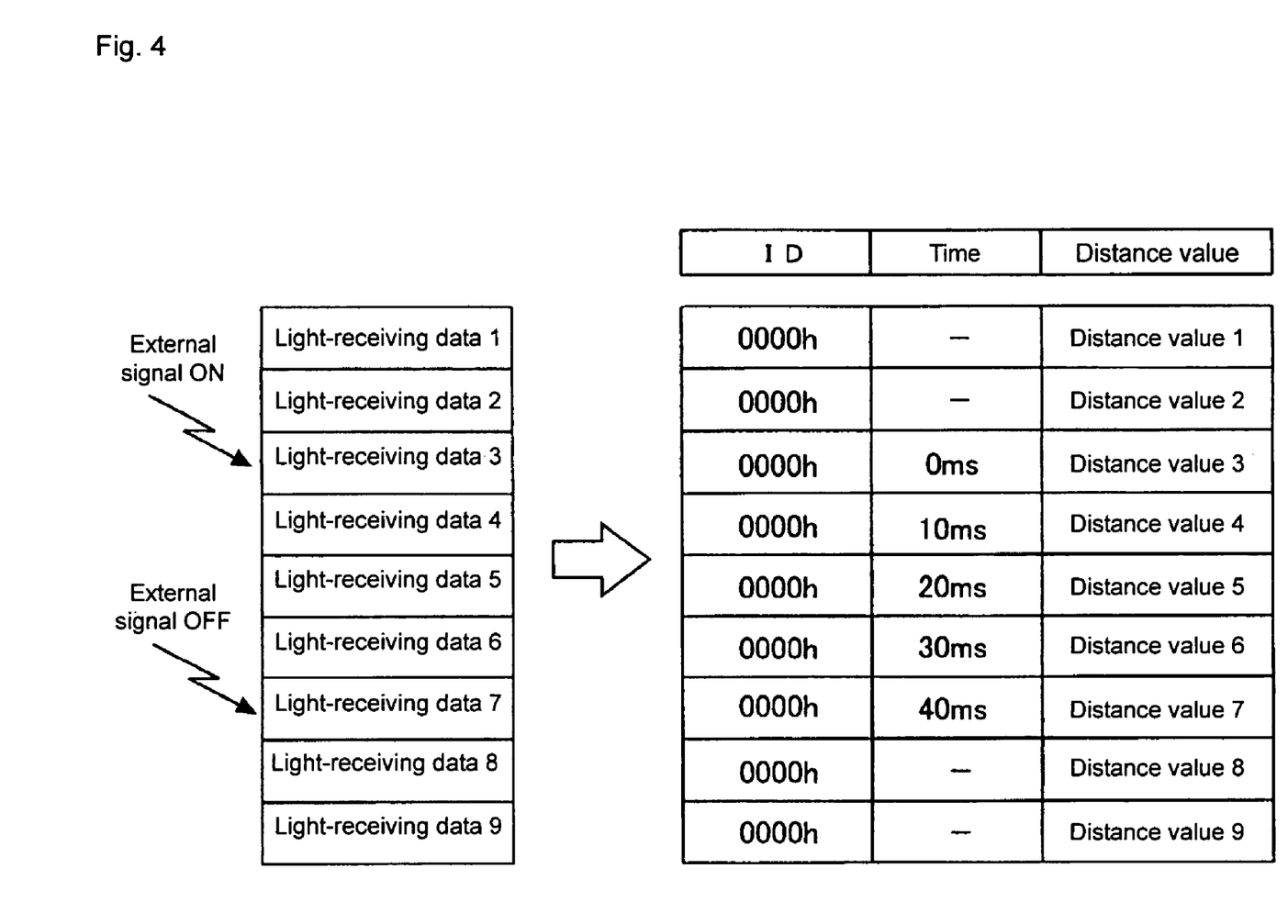
FIG. 4 shows an explanation of a process of adding timing information to a measurement value.

FIG. 4 shows an explanation about the timing sensing, and the process of adding timing information to the measurement value. In this example, an assumption is so made that the signal processor 2 acquires the light-receiving data 1 to 9, with the light-receiving data 3 acquired the external signal becoming ON (measurement start timing), and with the light-receiving data 7 acquired the external signal becoming OFF (measurement end timing). Herein, for convenience sake in the explanation, the light-receiving data 1 to 9 are shown, not to mention, the number of light-receiving data may vary.

When the signal processor 2 acquires the light-receiving data 1, 2, the external signal is OFF, therefore in this period, the number of measurements is cleared, leaving the measurement value (distance value 1, distance value 2) not added by the timing information. On the other hand, when the signal processor 2 acquires the light-receiving data 3 to 7, the external signal is ON, therefore in this period, elapsed timing information (0 ms, 10 ms, 20 ms, 30 ms, 40 ms) may be added to the measurement values (distance value 3 to distance value 7). In addition, when the signal processor 2 acquires light-receiving data 8, 9, the external signal is OFF, therefore in this period, the number of measurements is cleared, leaving the measurement value (distance value 8, distance value 9) not added by the timing information.

Hereinabove, other than the ON/OFF of the external signal, the sensing operation in a period when the timing information is added (measurement start timing to measurement end timing) may be determined, for example, by a self trigger in a timing which is so varied as to stride over a predetermined measurement timing determinant threshold.

Figure 5:
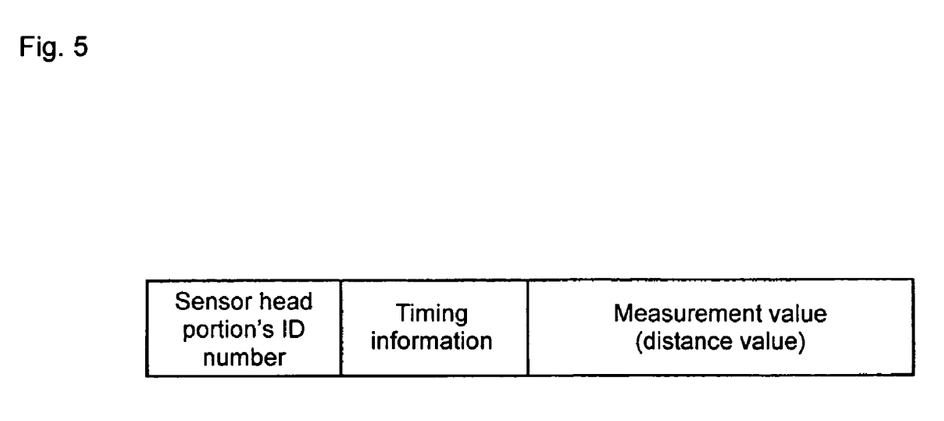
FIG. 5 shows an explanation of a data structure of data outputted from the signal processor.

As shown in FIG. 5, a structure of data outputted from the signal processor 2 to the PC 3 includes the measurement value (distance value), the timing information, and the sensor head portion's ID number. The timing information shows a time when the measurement value is acquired, thereby notifying when the measurement value is measured. The sensor head portion's ID number shows from which sensor head portion the data is received. With this, in the case that a plurality of signal processors (measurement instrument) make inputs to the PC 3, the PC 3 can distinguish the thus received measurement value.

Figure 6:
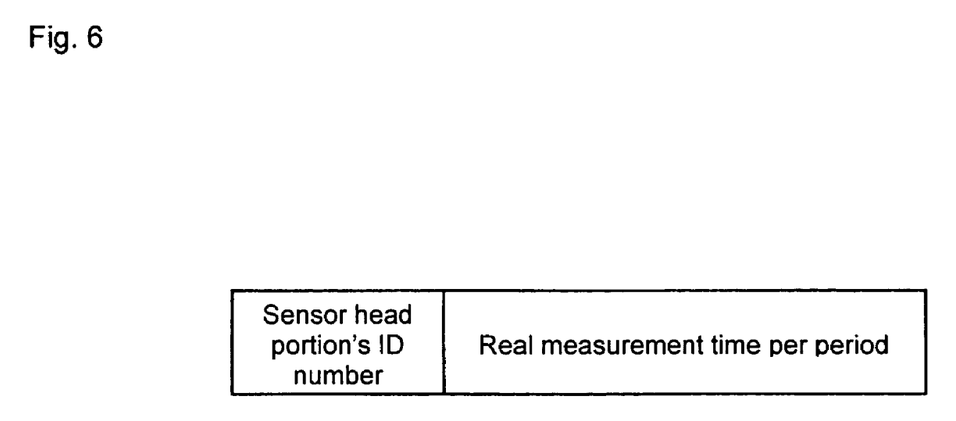
FIG. 6 shows an explanation of a memory structure of a sensor head portion.

A structure of the internal memory 106 of the sensor head portion 1 includes, as shown in FIG. 6, the sensor head portion's ID number and a real measurement time (measurement period) per period. The signal processor 2, when starting, acquires the measurement period and the sensor head portion's ID number from the sensor head portion 1, and uses the thus acquired measurement period for calculating the timing information. In addition, sending the measurement period from the signal processor 2 to the PC 3 allows the PC 3 to take a proper action even when the measurement periods differ with the measurement instrument in the case that an input is made to the PC 3 from a plurality of signal processors (measurement instrument). Hereinabove, the internal memory 106 of the sensor head portion 1 stores, other than the above, inherent information about the sensor head portion 1.

Figure 7:
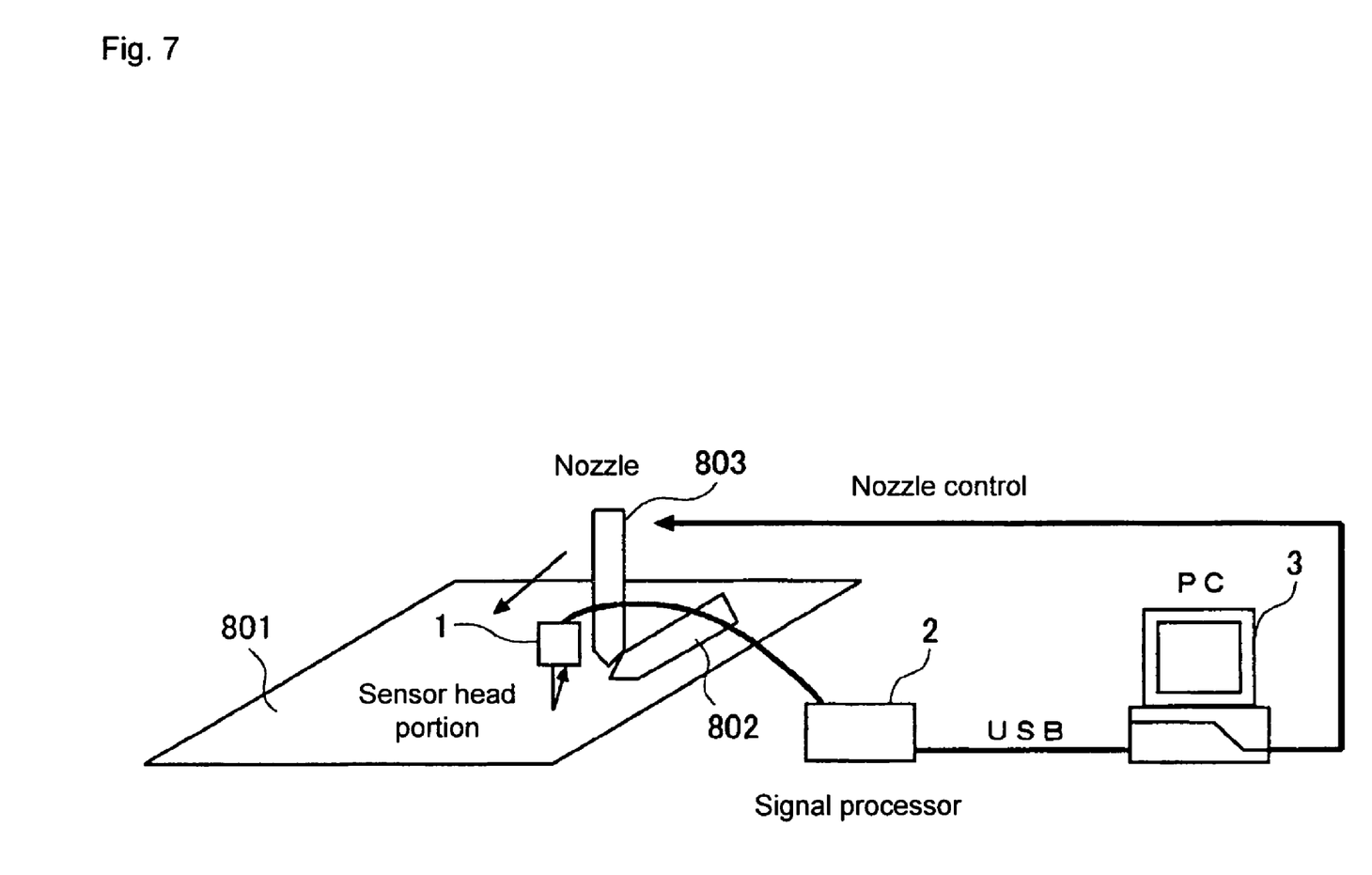
FIG. 7 shows an explanation of an application example of the measurement instrument of the present invention.

FIG. 7 shows an explanation showing an application example of the measurement instrument of the present invention. This example shows controlling of a nozzle 803 for applying a liquid crystal sealing agent 802 to a work 801. The nozzle 803 is united with the sensor head portion 1. The signal processor 2 is connected to the PC 3 via USB. The sensor head portion 1 measures surface irregularity of the work 801. Using the measurement value data which is measured by the sensor head portion 1 and received from the signal processor 2, the PC 3 makes such a control as to move the nozzle 803 upward and downward. The signal processor 2 stores in a predetermined period the data acquired by the sensor head portion 1, and then outputs collectively the data to the PC 3 after an interval. Acquiring the data which the sensor head portion 1 measured at a high speed, the PC 3 can implement various analyses, thereby accomplishing nozzle control based on a high-precision forecast.

Figure 8:
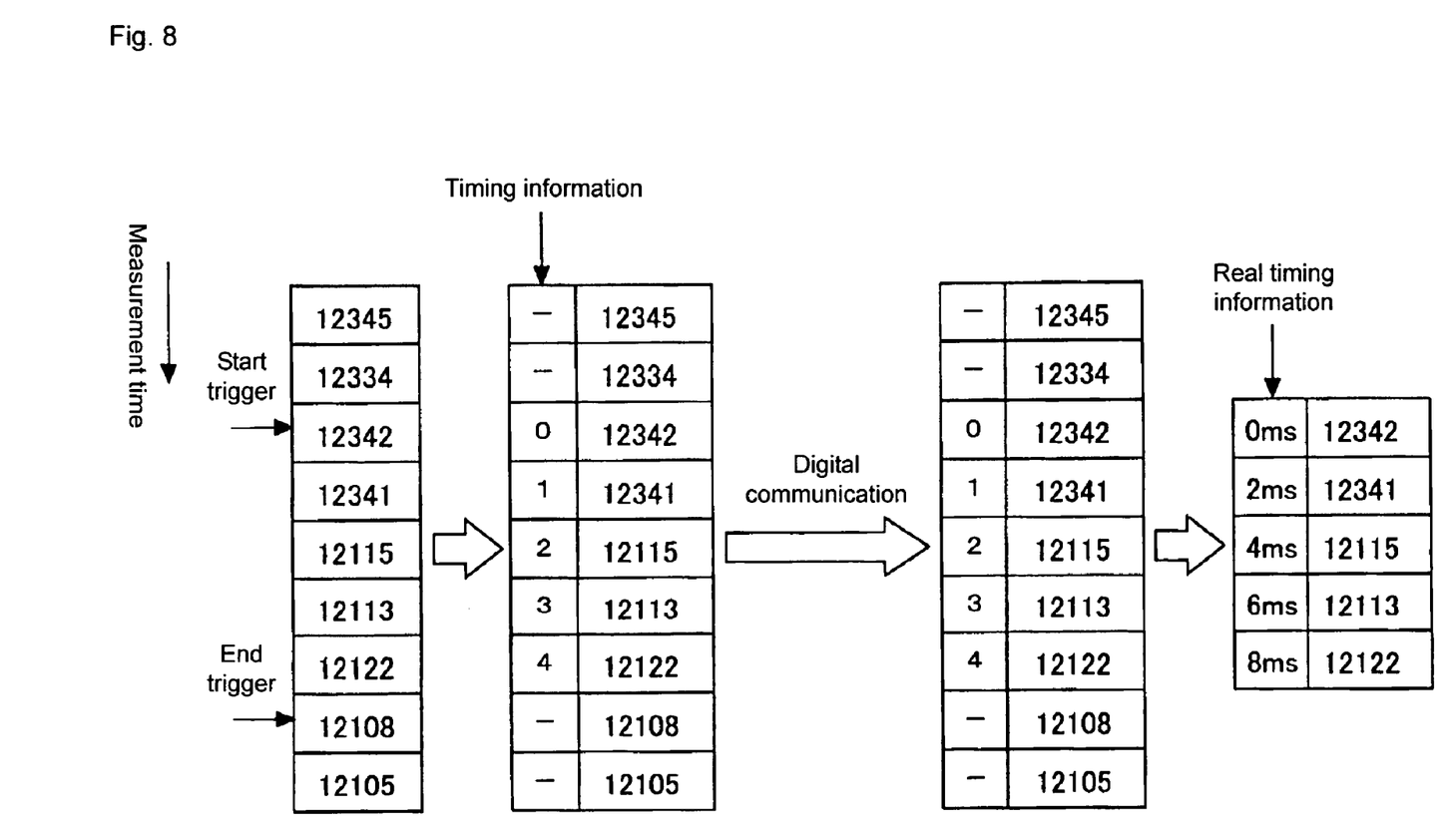
FIG. 8 shows an explanation of an operation of the measurement instrument of the present invention.

FIG. 8 shows an explanation of operation of the measurement instrument of the present invention. In this example, from the 3rd measurement value (12342), the measurement timing information is added to a series of nine measurement values (12345, 12334, 12342, 12341, 12115, 12113, 12122, 12108, 12105), with a start trigger as a measurement start timing. Then, as a measurement end timing, an end trigger is added to the 8th measurement value (12108). From the 3rd measurement value (12342) to the 7th measurement value (12112), as shown in FIG. 8, the timing information has sequential serial numbers (time series information). When the PC 3 receiving the data has a function of rearranging along the measurement time the data received from the signal processor 2, sending a measurement period (in this example, the period is 2 ms) via a USB communication (digital communication) to the PC allows the PC to rearrange the received data in real time.

Although the measurement instrument has been described as the displacement sensor according to the above embodiment, the measurement instrument of the present invention is, however, not limited to this, and may be so constructed as to be a temperature sensor or a visible sensor.

The scope of the present invention is defined with reference to the following claims.

What is claimed is:

1. A measurement instrument, comprising:
   i) a measurement value acquiring portion for acquiring a measurement value,
   ii) a trigger signal inputting portion into which an external trigger signal is inputted,
   iii) a processor for processing the thus acquired measurement value,
   iv) a data memorizing portion for memorizing data on a processing condition, and
   v) an interface portion for outputting the thus processed measurement value,
   wherein,
   the measurement value acquiring portion periodically acquires the measurement value,
   the data memorizing portion memorizes information specifying a maximum data number regarding the outputting collectively a plurality of the measurement values processed as the data on the processing condition,
   the processor adds to the periodically-acquired measurement value measurement timing information which is based on a timing when a trigger signal is inputted,
   wherein,
   I) a first digital outputting is implemented in which,
   the plurality of the measurement values added by the measurement timing information are, with an acquisition order kept, sectioned into a plurality of measurement values less than or equal to the maximum data number, and
   the sectioned plurality of the measurement values are digitally outputted collectively from the interface portion in a time shorter than a time determined by a product of the data number and a period,
   II) after the first digital outputting, a second digital outputting is implemented in which,
   within a time determined by a product of the maximum data number and the period, a plurality of measurement values added by next measurement timing information and following the outputted measurement values are, with an acquisition order kept, sectioned into a plurality of measurement values less than or equal to the maximum data number, and
   the sectioned plurality of the measurement values are digitally outputted collectively from the interface portion in a time shorter than a time determined by a product of the sectioned data number and the period, and
   III) then, the second digital outputting is repeated.

2. The measurement instrument as claimed in claim 1, wherein
the data memorizing portion memorizes one of a maximum data quantity and a maximum output period, as the information specifying the maximum data number in outputting collectively the plurality of the processed measurement values.

3. The measurement instrument as claimed in claim 1, wherein
the measurement timing information is a measurement start timing.

4. The measurement instrument as claimed in claim 1, wherein
the measurement timing information ,is a measurement start timing and a measurement end timing.

5. The measurement instrument as claimed in claim 1, wherein
the measurement timing information is a measurement start timing, and
the measurement timing information is added to the periodically-acquired measurement value, corresponding to a time series information based on the measurement start timing.

6. The measurement instrument as claimed in claim 1, wherein
the measurement timing information is a measurement start timing, and
the measurement timing information is added to the periodically-acquired measurement value, corresponding to elapsed timing information which is calculated from the measurement period, based on the measurement start timing.

7. The measurement instrument as claimed in claim 1, wherein
with the trigger signal inputted, the processor starts implementing the collective first digital outputting, and
in a period when the inputting of the trigger is continued, the processor repeats the collective second digital outputting.

8. The measurement instrument as claimed in claim 1, wherein
an identification number of an applicable measurement instrument which number is owned by the measurement instrument is further added to the measurement value.

9. A measurement instrument, comprising:
i) a measurement value acquiring portion for acquiring a measurement value,
ii) a processor for processing the thus acquired measurement value,
iii) a data memorizing portion for memorizing data on a processing condition, and
iv) an interface portion for outputting the thus processed measurement value,
wherein,
the measurement value acquiring portion periodically acquires the measurement value,
the data memorizing portion memorizes:
information specifying a maximum data number regarding the outputting collectively a plurality of the measurement values processed as the data on the processing condition, and
a timing determinant threshold which is compared with the measurement value,
the processor adds to the periodically-acquired measurement value measurement timing information which is based on a timing when the measurement value is so varied as to stride over the timing determinant threshold,
wherein,
I) a first digital outputting is implemented in which,
the plurality of the measurement values added by the measurement timing information are, with an acquisition order kept, sectioned into a plurality of measurement values less than or equal to the maximum data number, and
the sectioned plurality of the measurement values are digitally outputted collectively from the interface portion in a time shorter than a time determined by a product of the data number and a period,
II) after the first digital outputting, a second digital outputting is implemented in which,
within a time determined by a product of the maximum data number and the period, a plurality of measurement values added by next measurement timing information and following the outputted measurement values are, with an acquisition order kept, sectioned into a plurality of measurement values less than or equal to the maximum data number, and
the sectioned plurality of the measurement values are digitally outputted collectively from the interface portion in a time shorter than a time determined by a product of the sectioned data number and the period, and
III) then, the second digital outputting is repeated.

10. The measurement instrument as claimed in claim 9, wherein
the data memorizing portion memorizes one of a maximum data quantity and a maximum output period, as the information specifying the maximum data number in outputting collectively the plurality of the processed measurement values.

11. The measurement instrument as claimed in claim 9, wherein
the measurement timing information is a measurement start timing.

12. The measurement instrument as claimed in claim 9, wherein
the measurement timing information is a measurement start timing and a measurement end timing.

13. The measurement instrument as claimed in claim 9, wherein
the measurement timing information is a measurement start timing, and
the measurement timing information is added to the periodically-acquired measurement value, corresponding to a time series information based on the measurement start timing.

14. The measurement instrument as claimed in claim 9, wherein
the measurement timing information is a measurement start timing, and
the measurement timing information is added to the periodically-acquired measurement value, corresponding to elapsed timing information which is calculated from the measurement period, based on the measurement start timing.

15. The measurement instrument as claimed in claim 9, wherein with the measurement value so varied as to stride over the timing determinant threshold, the processor starts implementing the collective first digital outputting, and until the measurement value is so varied again as to stride over the timing determinant threshold, the processor repeats the collective second digital outputting.

16. The measurement instrument as claimed in claim 9, wherein an identification number of an applicable measurement instrument which number is owned by the measurement instrument is further added to the measurement value.

* * * * *